United States Patent [19]

Francois et al.

[11] 4,298,300
[45] Nov. 3, 1981

[54] MASTER-SLAVE MECHANICAL MANIPULATOR WITH HOMOTHETIC DISPLACEMENTS

[75] Inventors: Daniel François; Charles Glachet, both of Vendome, France

[73] Assignee: La Calhene, France

[21] Appl. No.: 78,056

[22] Filed: Sep. 24, 1979

[30] Foreign Application Priority Data

Sep. 29, 1978 [FR] France ............................... 78 27904

[51] Int. Cl.³ .............................................. B25J 3/02
[52] U.S. Cl. .......................................... 414/2; 414/917
[58] Field of Search ....................... 414/1, 2, 4, 5, 6, 7, 414/917

[56] References Cited

U.S. PATENT DOCUMENTS 3,219,200 11/1965 Ainsworth ............................... 414/4
3,391,801 7/1968 Haaker .................................. 414/1 X
3,664,517 5/1972 Germond et al. .................... 414/1 X Primary Examiner—Jeffrey V. Nase
Attorney, Agent, or Firm—Pearne, Gordon, Sessions, McCoy & Granger

[57] ABSTRACT

Master-slave manipulator having a master arm provided with a control handle and a slave arm controlled by the master arm and provided with a tool, said arms being connected by a shaft mounted in pivotal manner about its axis with respect to a fixed support, the master arm having at least one so-called shoulder articulation between itself and the shaft and perpendicular to the shaft axis, said slave arm being of the articulated type and having an upper arm articulated about a shoulder axis perpendicular to the shaft axis and a lower arm articulated with respect to the upper arm about an elbow axis parallel to the shoulder axis, wherein it comprises means for defining a first point occupying a homothetic position in a homothetic transformation of negative ratio relative to the shoulder axis of the arm of the control handle and means for transmitting position information from said point to the slave arm, said means comprising at least two rods, the first of said rods being articulated to the said point about an axis perpendicular to the shaft axis and relative to the second rod with an axis parallel to the first axis, said second rod being articulated by its other end to a second point connected to the shaft through which passes an axis parallel to said first axis, one of the rods being forced to remain parallel to the lower arm, whereby said rods have lengths proportional to the lengths of the corresponding lower and upper arm.

12 Claims, 11 Drawing Figures

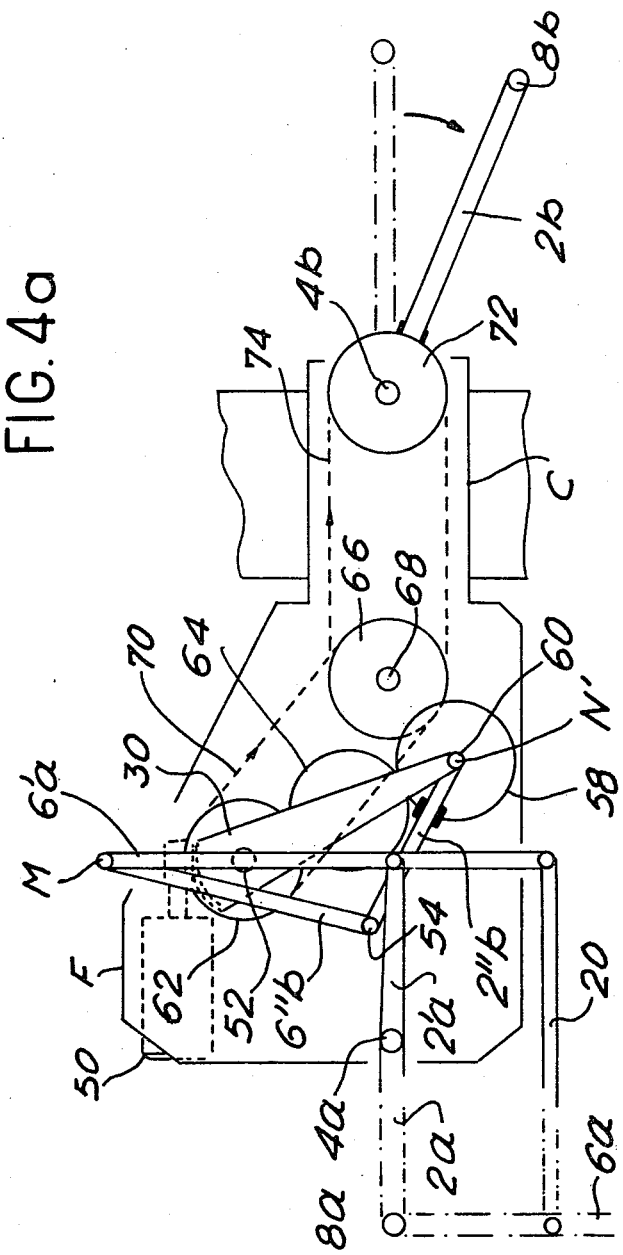

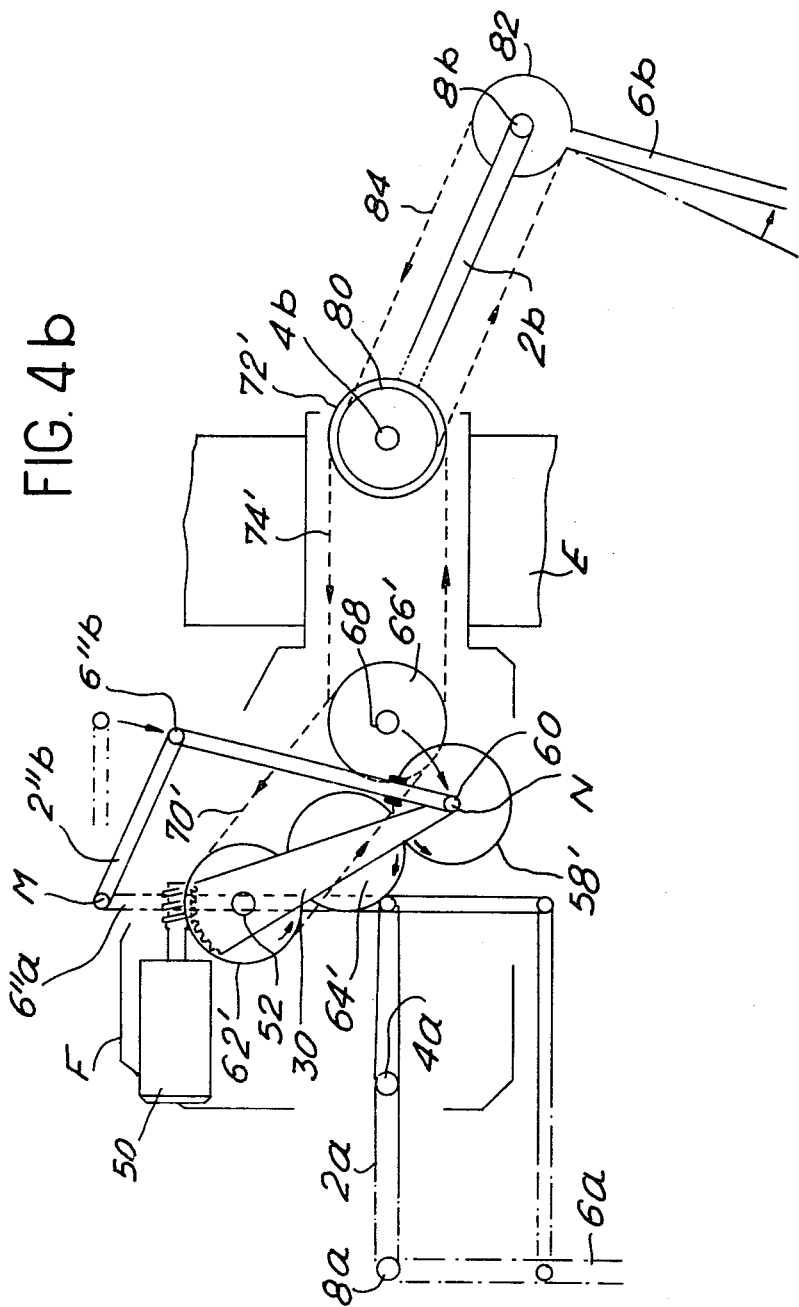

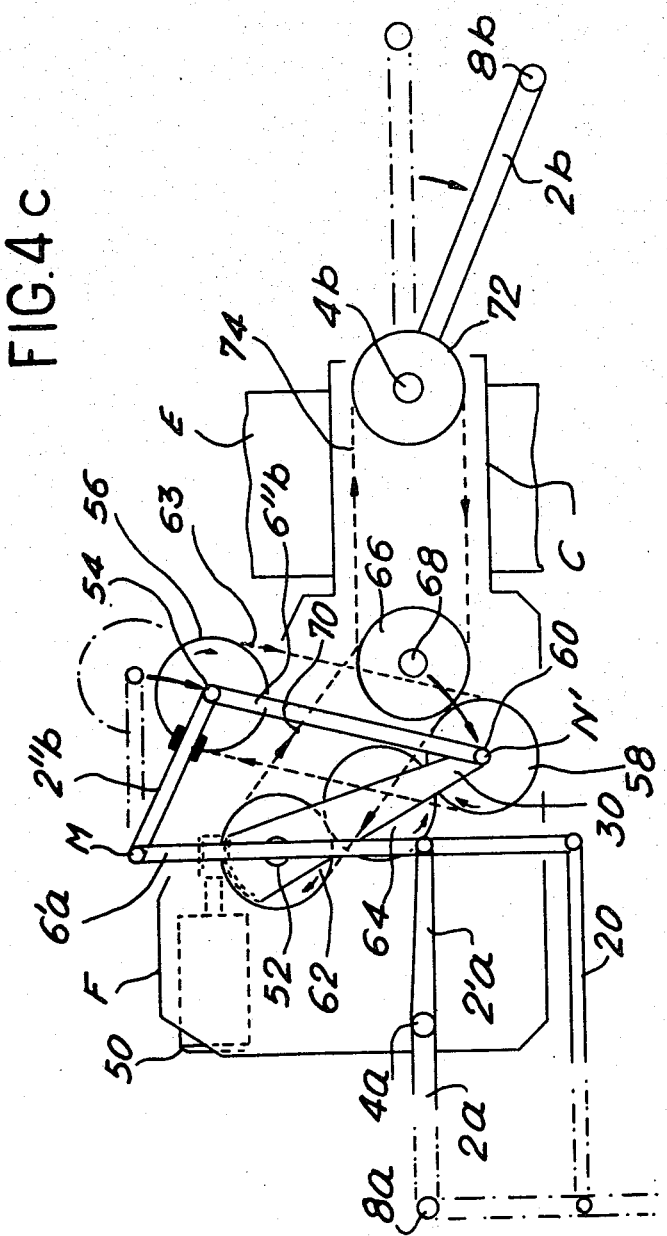

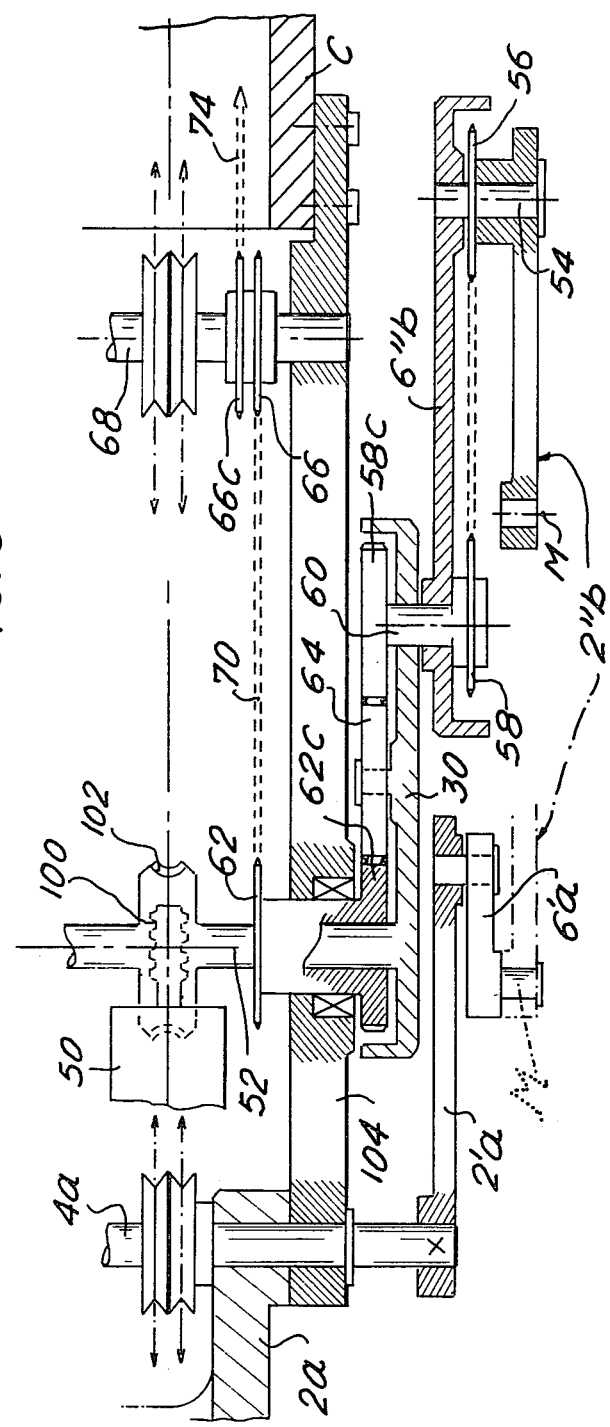

MASTER-SLAVE MECHANICAL MANIPULATOR WITH HOMOTHETIC DISPLACEMENTS

BACKGROUND OF THE INVENTION

The present invention relates to a master-slave mechanical manipulator with homothetic displacements.

It is known that manipulators of the master-slave type are manipulators in which there is on the one hand a master arm provided at its end with a control handle which is operated by the operator and on the other hand a slave arm controlled by the master arm and which carries a tool at its end. By controlling the movement of the different components of the master arm the operator causes corresponding movements of the different components of the slave arm, thus making it possible to move the tool fixed to the end of the slave arm. Conversely any movement imposed on the tool is reproduced by the control handle. Thus, any load applied to the tool is restored to the operator by the control handle. It is also known that certain of these manipulators are operated by motors, i.e. there is no direct mechanical connection between the movements of the master arm and the movements of the slave arm and instead there is a servocontrol of the motors controlling the two arms and providing the load return referred to hereinbefore.

The present invention relates to non-motorized manipulators, i.e. in which there is a direct mechanical transmission between the master arm and the slave arm.

A number of non-motorized manipulators are already known which have a master arm and a slave arm articulated to the ends of a shaft mounted in pivotal manner with respect to a fixed support. Certain of these manipulators have master and slave telescopic arms of the same size and having a displacement movement leading to the said two telescopic arms forming a relative angle which can reach at least 45°. Under these conditions any displacement of the control handle in the plane of the arm leads to a ssuperimposable slave tool displacement after a rotation having its centre in the plane of the arm.

When the slave arm and the master arm have different lengths the transformation making it possible to pass from master displacement to slave displacement becomes a similitude.

In addition, articulated manipulators are known having complex movements leading to a non-linear transformation of the displacements, which simultaneously causes the distortion of straight lines and angles.

In all three cases the operator is inconvenienced by the disorientation due to the similitude rotation angle and/or the linear and angular distortion. It is readily apparent that the vertical displacement of the heavy load causes considerable difficulties for the operator when the handle has to follow an oblique or curved path.

BRIEF SUMMARY OF THE INVENTION

The manipulator according to the invention obviates this disadvantage by reproducing any travel of the control handle in the manipulator plane in accordance with a homothetic transformation (or in a special case a translation movement), whilst providing a complex geometry of the articulated arm and whilst permitting, according to a preferred embodiment, a large auxiliary displacement of the slave arm relative to the master arm. As a result of this displacement for a random given position of the immobile master arm it is possible to modify the position of the slave arm. Thus, whilst limiting the volume in which the control handle is displaced it is possible to reach the maximum volume by means of the tool fixed to the master arm.

In its simplest form the invention relates to a master-slave manipulator having a master arm provided with a control handle and a slave arm controlled by the master arm and provided with a tool, said arms being connected by a shaft mounted in pivotal manner about its axis with respect to a fixed support, the master arm having at least one so-called shoulder articulation between itself and the shaft and perpendicular to the shaft axis, said slave arm being of the articulated type and having an upper arm articulated about a shoulder axis perpendicular to the shaft axis and a lower arm articulated with respect to the upper arm about an elbow axis parallel to the shoulder axis, wherein it comprises means for defining a first point occupying a homothetic position in a homothetic transformation of negative ratio relative to the shoulder axis of the arm of the control handle and means for transmitting position information from said point to the slave arm, said means comprising at least two rods, the first of said rods being articulated to the said point about an axis perpendicular to the shaft axis and relative to the second rod with an axis parallel to the first axis, said second rod being articulated by its other end to a second point connected to the shaft through which passes an axis parallel to said first axis, one of the rods being forced to remain parallel to the lower arm, whereby said rods have lengths proportional to the lengths of the corresponding lower and upper arm.

Thus, by means of these two rods with respect to the slave arm the equivalent of a second homothetic transformation of negative ratio is obtained, the product of the two homothetic ratios providing a direct homothetic transformation or a translation movement.

According to a more elaborate embodiment the manipulator has controllable means for displacing the second point relative to the shaft, i.e. displacing the centre of the homothetic transformation of negative ratio between the first point and the end of the slave arm whilst maintaining the negative ratio constant.

Thus, it is possible to introduce between the master arm and the slave arm a controllable shift without changing the law linking the displacements between the master arm and the slave arm

BRIEF DESCRIPTION OF THE DRAWINGS

The invention is described in greater detail hereinafter relative to non-limitative embodiments and with reference to the attached drawings, wherein show:

FIG. 4a a simplified view showing the mechanisms mounted on the shaft permitting the transmission of the movement about the shoulder articulation during a displacement.

FIG. 4b a view similar to that of FIG. 4a but showing the transmission of movement about the elbow articulation in the same hypothesis.

FIG. 4c a constructional variant of the shoulder control.

FIG. 5 a half view in section parallel to the articulation axes showing an exemplified embodiment of the transmission and displacement mechanisms between the master arm and the slave arm.

DETAILED DESCRIPTION OF THE PREFERRED EMBODIMENTS

Figure 1:
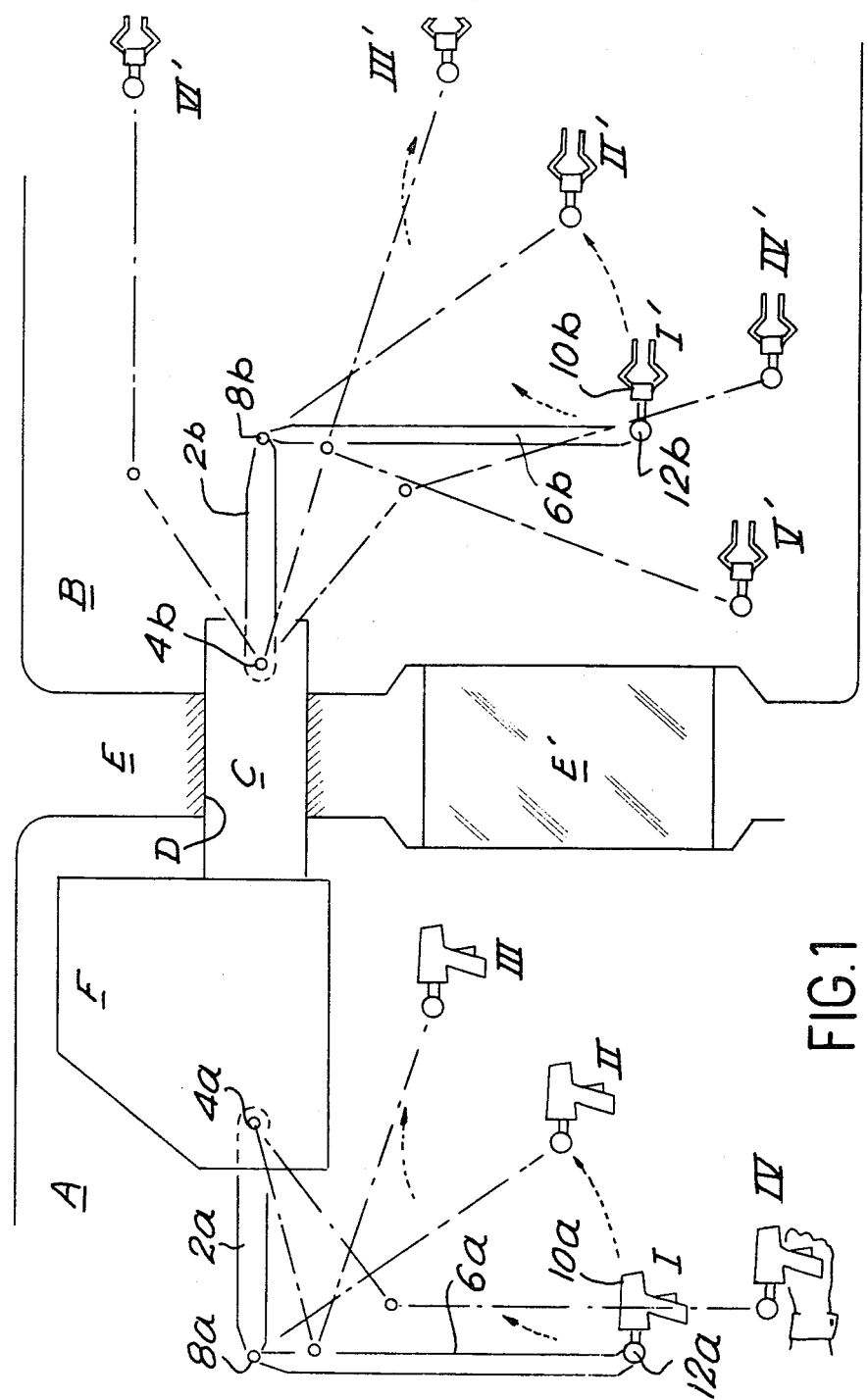
FIG. 1 a simplified view of the complete manipulator illustrating its general construction, as well as the possibilities which it must have for meeting the conditions of use.

FIG. 1 shows in highly diagrammatic manner in elevation in its own plane the manipulator system. The latter comprises a master part A, a slave part B which are inconnected by a shaft C mounted so as to pivot in a connector D of a wall E.

The protective wall E has for example a protective window E' enabling the operator controlling the master arm A to permanently see the position of the end of slave arm B. From the side of master arm A there is an upper arm 2a mounted so as to pivot about a shoulder axis 4a perpendicular to the plane of the drawing at one end of shaft C, a lower arm 6a mounted in pivotal manner relative to upper arm 2a about an elbow axis 8a parallel to axis 4a and a control handle 10a mounted in pivotal manner at the end of the lower arm 6a about a knuckle joint axis 12a. This drawing does not show the possible movement of the lower arm about its longitudinal axis or the possible pivotal movement of handle 10a about its own axis. It is pointed out that the knuckle joint axis 12a remains orthogonal to the longitudinal axis of the lower arm 6a and that the pivotal movement of the shaft about its own axis makes it possible to remove the master and slave arms from the plane of FIG. 1. From the slave arm side exactly the same construction occurs, the equivalent members carrying the same reference numerals but followed by the letter b.

I, II, III and IV are four positions of the control handle 10a and more specifically the knuckle joint axis 12a. From side b there are four corresponding positions I', II', III', and IV' of tongs 10B. All these displacements are in the plane of the manipulator. As stated hereinbefore the essential characteristic of the manipulator according to the invention is that for passing from one position to the following position the tongs 10b follow a trajectory which is homothetic and of positive ratio of the path followed by the control handle 10a. Homothetic is understood to mean that the rectilinear displacements of the control handle produce rectilinear displacements of the tongs in parallel paths and of the same direction and that also there is a constant ratio between the length of the control handle path and that of the tongs (often equal to or less than 1).

It is clear that with such an operating procedure the work of the operator is greatly simplified.

On the slave part of FIG. 1 there are two other positions V' and VI' corresponding to the introduction of an auxiliary displacement between the master arm and the slave arm. Thus, for a given position of the master arm by acting on the displacement system a displacement is brought about of the slave arm without changing the parallelism and the ratio of the paths.

Clearly as a result of this arrangement it is possible to reach all the space accessible to the tongs 10b due to the geometry of the manipulator, whilst permitting the operator to stay in one place for controlling the control handle 10a, in other words the area in which he has to move the control handle in order that the tongs scan the complete accessible space of the slave side is reduced. On the one hand this simplifies the work of the operator and on the other it enables the operator to assume a good position relative to window E' for observing the tongs.

However, it is pointed out that in the case of the manipulator according to the invention homothetic displacements are strictly obtained in the manipulator plane shown in FIG. 1. In other planes corresponding to a rotation of shaft C about its axis these displacements remain strictly homothetic if the displacement takes place parallel to the axis of shaft C.

F designates the mechanisms mounted on shaft C and making it possible to obtain on the one hand the displacement of the tongs as a function of the control handle position following the process described hereinbefore and on the other the introduction of the displacement between the master arm and the slave arm. In a preferred manner the mechanisms F are on the master arm side.

Figure 2A:
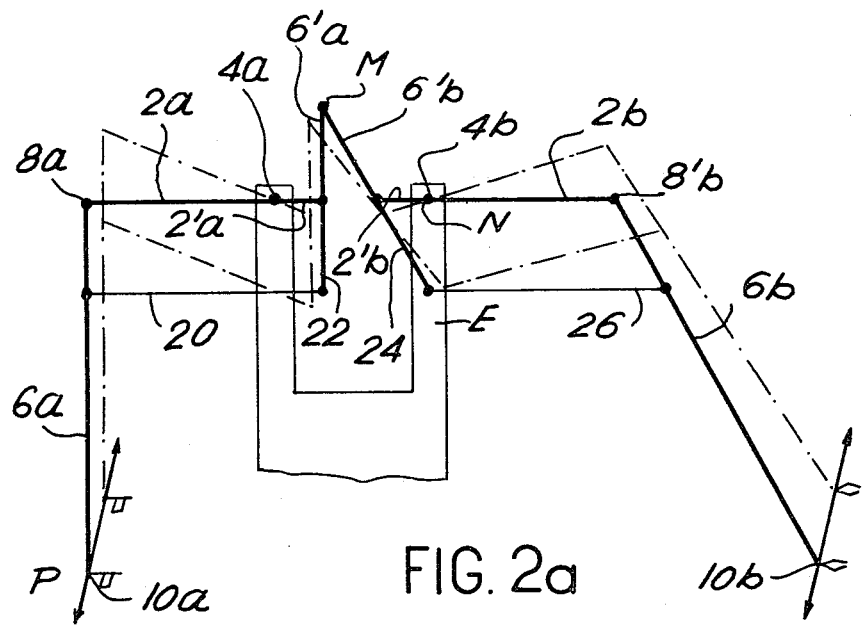
FIGS. 2a and 2b diagrammatic constructional forms of the manipulator according to the invention showing how the slave arm is controlled from the master arm.
Figure 2B:
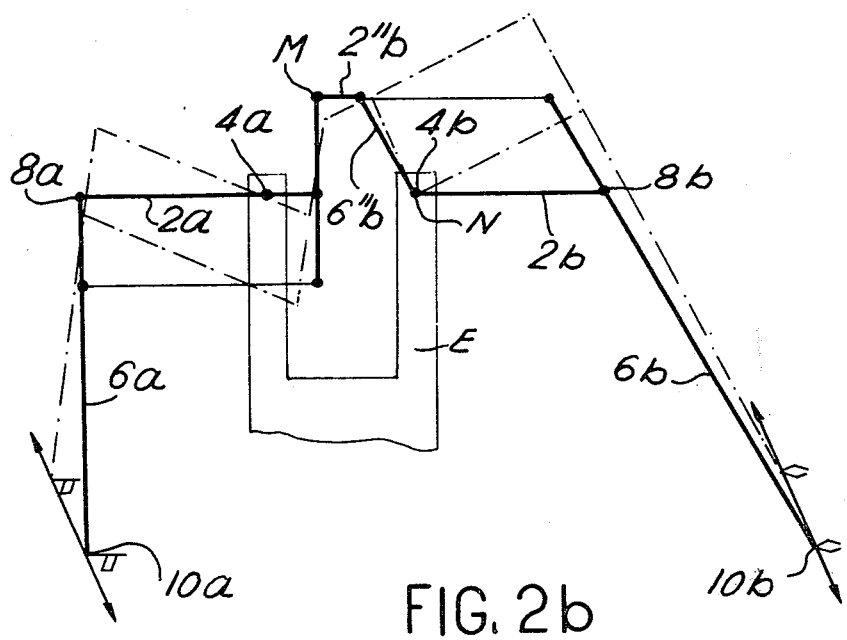

FIGS. 2a and 2b diagrammatically show the way in which the displacements of the master arm are transmitted to the slave arm in order to obtain homothetic displacements (in this case a translation movement due to the fact that the arm lengths and the homothetic transformation ratios are equal, without any displacement taking place). As stated hereinbefore the upper master arm 2a is extended by a first lever 2'a articulated at its one end to a second lever 6'a. Moreover lever 6'a is forced to remain parallel to the lower arm 6a by making a deformable parallelogram constituted by a rod 20 and an extension 22 of lever 6'a. Moreover levers 2'a and 6'a have lengths which are respectively proportional to those of the upper arm 2a and the lower arm 6a. Thus, point M, the end of lever 6'a is homothetic of the end P of lower arm 6a in a homothetic transformation having for its centre the shoulder axis 4a and of negative ratio. In the same way on the slave arm side the upper arm 2b is extended beyond the shoulder axis 4b by a rod 2'b, which is articulated to a second rod 6'b, itself articulated with respect to lever 6a at point M. In the same way the extension 24 of rod 6'b and the extension of rod 26 force rod 6'b to remain parallel to the lower arm 6b. Moreover the lengths of rods 2'b and 6'b are respectively proportional to the lengths of the upper arm 2b and the lower arm 6b (in this case the arms are of the same length and the two homothetic transformations of the same ratio).

Thus, in other words by means of a first mechanical construction it is possible to define a point M which is homothetic of point P about the shoulder axis 4a with a negative homothetic transformation ratio and the position of the upper arm and the lower arm is controlled by means of a system of rods joining the first point M to a second point N, which in this case coincides with the shoulder axis 4b. In FIG. 2a the master arm is an articulated arm. Taking account of the comment made hereinbefore it is clear that nothing would be changed if the articulated master arm was replaced for example by a telescopic arm. In this case it would merely be necessary to produce by an appropriate device a point M homothetic of point P of the telescopic master arm. On the basis of said point M and using the system of rods described hereinbefore the slave arm would be controlled in the same way.

In FIG. 2b a transmission variant is shown. It is apparent that these two drawings are very similar and that the only difference is in the articulation of rods 2"b and 6"b replacing rods 2'b and 6'b in FIG. 2a. It is also clear that is merely a transposition of these two rods, which obviously leads to the same control result.

These two embodiments each have advantages and the choice of one or other of these solutions is dependant on the general construction of the manipulator.

Figure 3:
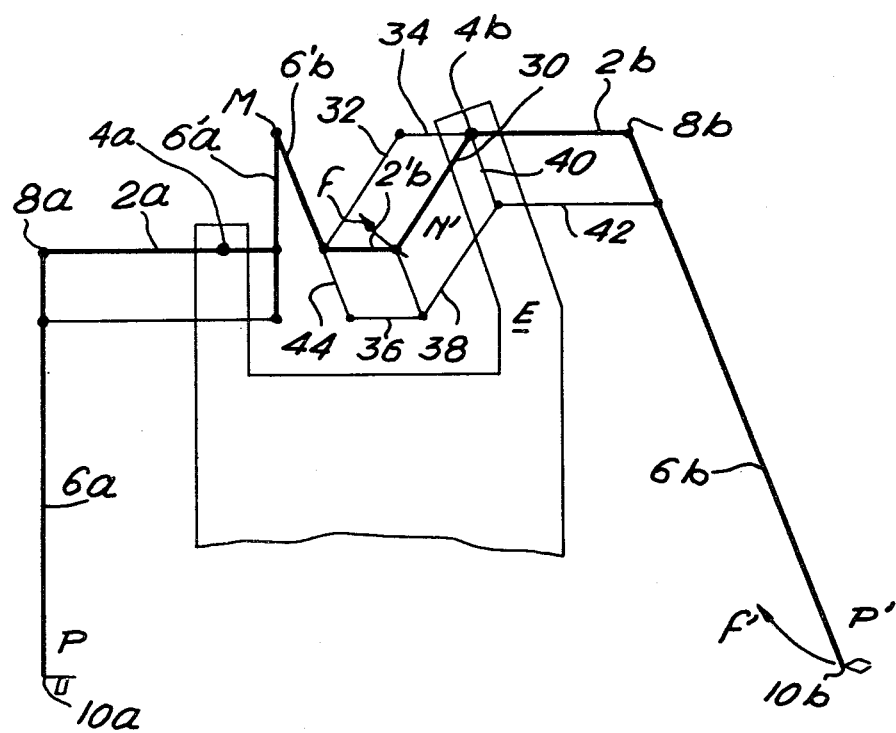
FIG. 3 a simplified view showing how it is possible to introduce a displacement between the master arm and the slave arm.

It should also be noted that in the case of a specific embodiment point N, which in this case coincides with the slave shoulder axis is in reality spaced from the latter and that the transmission members which will be described subsequently provide the equivalent of these connections. Finally the overall transmission ratio (between the master and slave arms) which is equal to 1 in the drawing can differ from said latter value. FIG. 3 shows in a very simplified manner the introduction of the displacement control between the master arm and the slave arm. Identical components are given the same reference numerals as in FIGS. 2a and 2b.

In FIG. 3 the master portion is identical up to point M to that shown in FIGS. 2a and 2b. Between point M and point N', identical to point N, there are once again rods 6'b and 2'b having the same relationships with respect to the upper arm 2b and the lower arm 6b. The essential difference is in the fact that point N' is no longer fixed, but instead constitutes the end of a third rod 30 articulated about the shoulder axis 4b. However, it is pointed out that the articulation point of lever 30 could be different and it has only been selected as such to simplify the drawing. Linkage systems carrying the reference numerals 32 to 44 merely symbolize and provide in simplified manner the maintenance of the parallelism between the lower arm 6b and the lever and the rod 6'b and between rod 2'b and upper arm 2b.

It is readily apparent that if the master arm is kept fixed and lever 30 is operated for pivoting it about its axis, i.e. displacing point N' in accordance with arrow f an overall displacement of the slave arm is produced, i.e. point P' is displaced in accordance with arrow 4'. However if point N' is immobilized, i.e. there is no action on the displacement control the operation of the transmission between the master arm and the slave arm takes place in exactly the same way as described in conjunction with FIG. 2a.

It is obvious that a completely similar arrangement is obtained by replacing the transmission mode of FIG. 2a with the transmission mode of FIG. 2b.

It is also pointed out that for simplifying FIGS. 2a to 3 the manipulator shaft is not shown. However, it is clear that all the mechanisms described hereinbefore are located in the manipulator shaft.

The manner in which the movements of the upper arm and the lower arm of the master arm are transmitted to the upper arm and lower arm of the slave arm will now be described in a still simplified, but more specific manner with reference to FIGS. 4a to 4c. FIGS. 4a and 4c show the mechanisms permitting the transmission of the movement of the upper arm only, whilst FIG. 4b shown the transmission of the movement to the lower arm only. In reailty there is no superimposing of these two controls, which are located on either side of the shaft. Moreover in FIGS. 4a to 4c a displacement mechanism is known. Obviously the transmission of the movements is exactly the same if there is no displacement, but instead a movement of the master arm to be transmitted directly to the slave arm.

In FIG. 4a of the master side there are once again the same arrangements as shown on the preceeding drawings and there is no need to describe them again. There is in particular the levers 2'a, 6'a and rod 20 ensuring the parallelism between the lever 6'a and the lower arm 6a. There are also rods 2"b and 6"b shown in FIG. 3, rod 2"b terminating at point N' articulated to lever 30 permitting the introduction of the displacement. Displacement introduction takes place by controlling the geared motor 50 fixed to shaft C. Geared motor 50 controls the pivoting of lever 30 about its shaft 52. Rod 6"b is articulated at 54 to rod 2"b, which, according to the invention, must remain parallel to the upper arm 2b, (see FIG. 2a). To this end rod 2"b is fixed to a wheel 58 mounted so as to pivot about the shaft 60 materialising point N'.

The information thus contained in wheel 58 is transmitted to a wheel 62 which is loosely mounted on shaft 52. The transmission between wheel 58 and wheel 62 is effected for example by means of a transmission gear 64 which meshes with the toothed wheels 58 and 62. The pivoting information contained in wheel 62 is transmitted to an intermediate pulley 66 mounted in pivotal manner about a spindle 68 fixed to the shaft C by means of a chain 70. A pulley 72 fixed to the upper arm 2b is mounted so as to pivot about the shoulder axis 4b. The wheels or pulleys 58, 62, 66 and 72 of the same diameter and the chain system 74 transmits the rotation information of pulley 66 to pulley 72.

It is apparent that during a displacement produced by controlling the pivoting of lever 30 or during an action on the master arm the information concerning the movement of the upper slave arm 2b is transmitted from pulley 66 to pulley 72 fixed to the upper arm 2b by means of pulleys 58, 62 and 66 successively.

It is pointed out that rod 6"b only connects the point M to joint 54 by driving rod 2"b, i.e. by defining the angle of the upper arm 2b, but rod 6"b does not drive the movement of lower arm 2b. The mechanisms shown in FIG. 4a are mounted on one side of the shaft, whilst a second assembly of rod 2"b and 6"b mounted on the other side of the shaft provides the transmission of the angle of lower arm 6b. These mechanisms are shown in FIG. 4b.

In the same way as in FIG. 4a it is advantageous to place the information which is to be transmitted directly on the wheel mounted about shaft 60 materialising point N' (58' in this drawing). This is the angle of the lower arm for this mechanism. Thus, in the preferred embodiment rods 2"b and 6"b are transposed with respect to FIG. 4a. This does not change the angles of said rods with respect to the shaft C.

The information is transmitted to pulley 62' mounted on shaft 52 by means of the toothed pulley 64' and pulleys 58' and 62' are obviously also toothed.

The information thus contained in pulley 62' is transmitted to pulley 66' mounted so as to pivot about spindle 68 by means of chain 70'. The rotation information contained in pulley 66' which has the same diameter is transmitted to pulley 72' which has the same diameter, mounted in pivotal manner on the shoulder spindle 4b. A second pulley which is also mounted on spindle 4b is integral in rotation with pulley 72' and which is given the reference numeral 80 in the drawing transmits by a cable or chain system 84 the position information to the pulley 82, mounted so as to pivot about the elbow spindle 8b and fixed to the lower slave arm 6b. (It should be noted that the latter transmission could be carried out in an equivalent manner by a parallelogram).

It is thus clear that during a displacement by the action on geared motor 50 or during an action on the master arm the transmission of the information relative to the position of the lower arm is initially recorded by pulley 58' fixed to rod 6"b. This information passes via pulleys 62', 66', 72' and finally 82 and is then transmitted to the lower arm 6b.

As has been stated hereinbefore the complete construction of this mechanism relative to the introduction of the displacement and to the transmission of the position information or the displacement of the upper and lower arms comprises the juxtapositioning of mechanisms of FIGS. 4a and 4b on either side of shaft C. Thus, it is apparent that in this way a plurality of pulleys are mounted on common shafts. There are in fact two levers 30 fixed to one another and symmetrical with respect to the vertical plane of symmetry of the shaft and of the system of mechanisms. FIG. 4c shows a variant of the transmission of the shoulder movement using the same arrangements of rods 2"b and 6"b as in FIG. 4b. The rotation information for upper arm 2b is transmitted by rod 2"b to portion 56 integral therewith and which pivots freely about the shaft 54. The drawing shows a return by chain 63 of toothed pulley 56 to the pulley 58 having the same diameter. There could also be an equivalent return system 60, 62, 64 shown on the displacement rod 30.

This variant has the advantage of obviating the crossings of rods 6a, 6"b shown in FIG. 4a, but has the disadvantage of adding a transmission countershaft 56, 58.

The arrangement of the various members in the mechanisms is made clear by FIG. 5, which is a half-view in section in accordance with a plane parallel to the articulation axes of the mechanisms. This drawing shows that the output of geared motor 50 comprises a worm 100 which meshes with a toothed segment 102 fixed to shaft 52. It also shows that pulley 62, which is loosely mounted on shaft 52 is fixed to a toothed pinion 62c which meshes with the toothed pinion 64 carried by lever 30. Pinion 64 itself meshes with toothed pinion 58c, which is integral in rotation pulley 58, It also shows that pulley 66 over which passes chain 70 is in fact coupled with a pulley 66c over which passes chain 74. This drawing also shows a wall 104 of casing F fixed to the shaft C containing the mechanisms. FIG. 5 corresponds to the variant of FIG. 4c.

It is pointed out that in this complete embodiment the second half-view corresponding to the rotation control of the lower arm described diagrammatically with FIG. 4b has not been shown. At the other end of shaft 52 there is a second system of pinions carried by a second arm symmetrical to arm 30. The only difference is that there is no equivalent of pulley 56. It is also pointed out that the half-view shows supplementary pulleys carried by the master shoulder spindle 4a and the countershaft 68 and they are used for the control of movements about the knuckle joint axis and an azimuthal movement of the lower arm, i.e. a rotation movement of said arm about its longitudinal axis.

Figure 6:
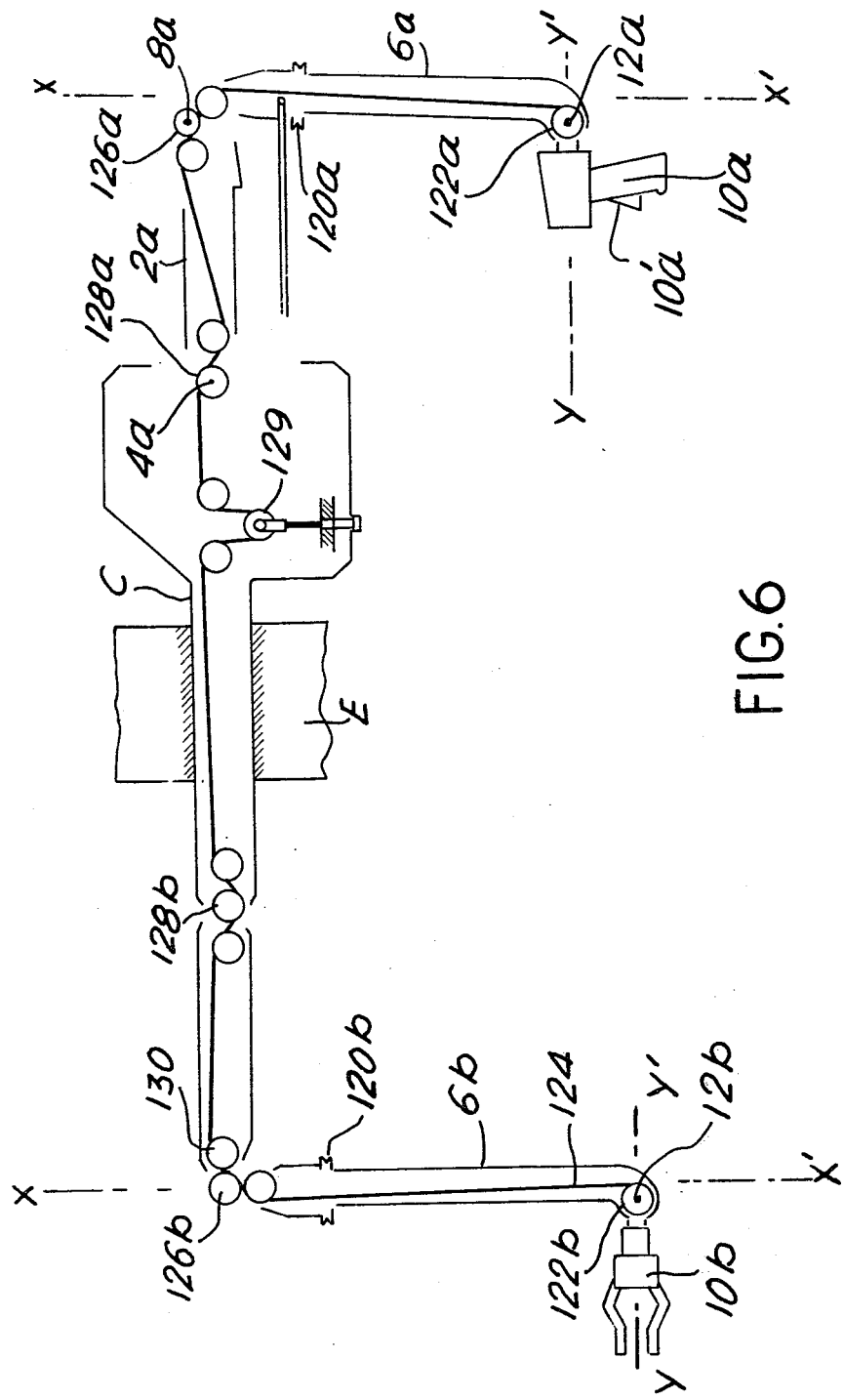
FIG. 6 a simplified view showing an exemplified embodiment of the manipulator and having only the control cables for a movement of the knuckle joint.

FIG. 6 shows the complete manipulator according to the invention to illustrate the various possibilities of movement and the control of the movement transmission about the knuckle joint axes, i.e. about the axes between the lower arms and the control handle 10a or tongs 10b.

As is well known in the field or articulated manipulators in addition to the movement of the upper arm and the pivotal movement of the lower arm with respect to the upper arm about the elbow axis lower arm 6a rotates about its longitudinal axis X—X'. This movement is controlled in known manner by cables terminating on a pulley 120a–120b, whose axis coincides with the axis X—X' and which can thus rotate the lower arms 6a and 6b. Tongs 10b perform a rotation movement about the knuckle joint axis 12b and also a rotary movement about an axis Y—Y' perpendicular to axis 12b. The corresonding movements naturally occur for the control 10a. Finally there is a closing control for tongs 10b by acting on a control catch 10'a carried by the control handle 10a. As an example of these various movements a more detailed description will be given of the control of the rotation about the knuckle joint axes, i.e. about axes 12b and Y—Y' of the tongs. As is known this double possibility of rotation is ensured by a planetary system having two driving pulleys 122b for the slave part and 122a for the master part, said two pulleys being mounted respectively on spindles 12a, 12b. The control of one of these pulleys will now be described. This control is obtained by means of a cable 124 and a non-shown opposing cable, so as not to overburden the drawing. Cable 124 passes beneath the pulley 122b, beneath the pulley 126b mounted on the elbow spindle and below pulley 128b mounted on the shoulder spindle. In the same way this strand on the master arm side passes beneath the pulley 128a of the shoulder spindle and 126a of the elbow spindle. In order to permit large deflections return pulleys such as 130 are provided on either side of the pulleys connected to the rotation spindles. Obviously the opposing cable passes over similar pulleys having the same diameter, but which are positioned above the same. It is pointed out that cable 124 passes on to a tightening system 129 mounted in shaft C, whilst the opposing cable has its own tightening system.

The control of the second pulley of the knuckle joint axes is obtained in a similar manner. The same is the case with respect to the control of pulleys 120a–120b permitting the pivoting of the lower arms about their longitudinal axes, in accordance with the well known procedures.

Through the use of pulleys having the same diameter juxtaposed for each cable and for the opposing cable with opposite windings the pulleys remain parallel to themselves in space for any position of all the master and slave segments and this is particularly the case with pulleys 12a and 12b. The angle of said pulleys with respect to the return means towards pulleys 120a and 120b is dependant on the angle of lower arms 6a and 6b in space. Thus, any relative orientation difference between lower arms 6a and 6b leads to a difference in the rotation of axis X—X' between the latter. As pulleys 120a–120b are larger than pulleys 126 and 128 this difference is divided by a factor of at least two. Finally in practice the relative angle formed by arms 6a, 6b never exceeds 60°, leading to a parallelism error of about 30° between handle 10a and tong 10b.

Figure 7:
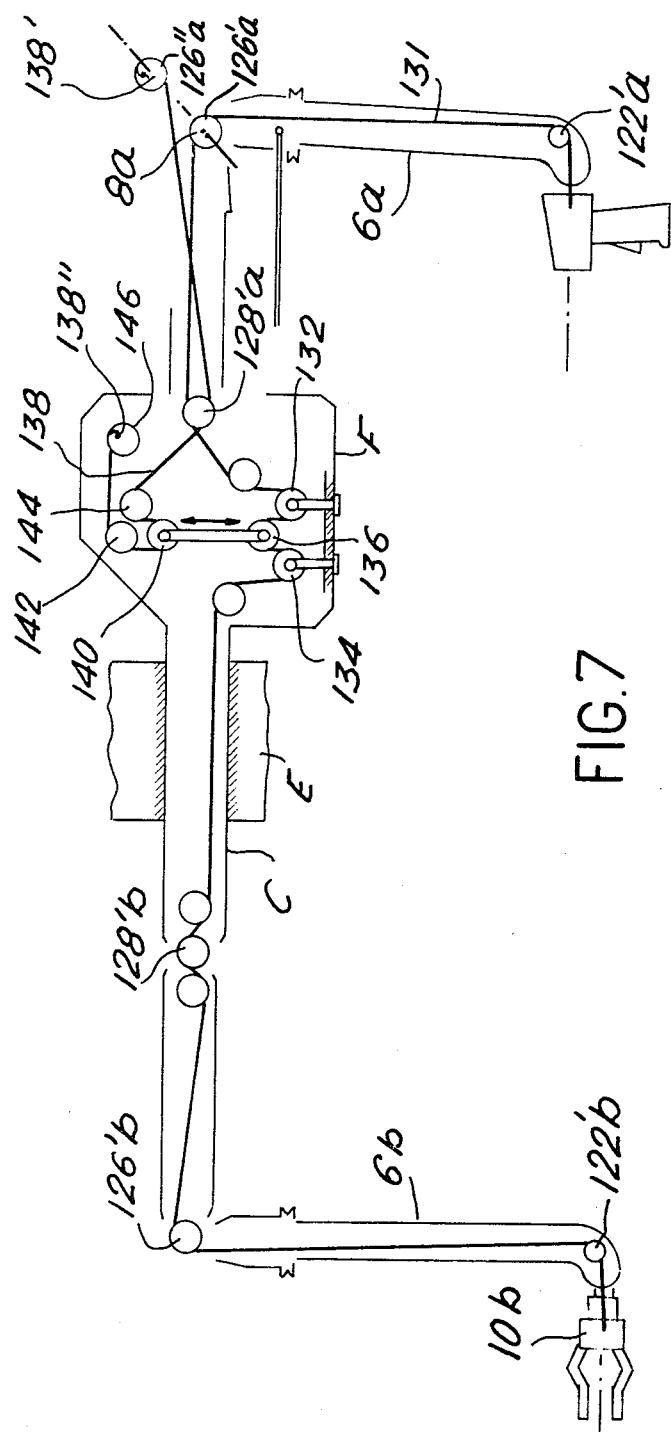
FIG. 7 another simplified view of the complete manipulator showing the control cables for closing the tongs with compensation for said closing.

The same effect occurs to the cable for closing the tongs, which comprises a single strand because it is standard practice to use an opposing spring. Under these conditions the relative angle between 6a and 6b would cause a variation in the opening of the tongs with a constant positioning of catch 10'a. In this case correction would be necessary and this is described by FIG. 7 with reference to the closing movement of the tongs in the preferred form of the invention and applies in a similar manner to the perfect correction of axis X—X'.

It is readily apparent that it is necessary to have a very good compensation, otherwise the object held by the tongs will drop out during the operation of the lower arm with respect to the upper arm. The control of the opening and closing of the tongs and more particularly the way in which this special control system is compensated will be described in greater detail with reference to FIG. 7. Cable 131 passes over the pulleys mounted on the different articulation shafts of the manipulator. There are pulleys 126'a, 128'a, 128'b and 126'b successively.

In articulations 12a and 12b there are very small pulleys 122'a and 122'b having a negligible action according to the angle of the tongs. It should be noted that cable 131 has no opposing cable, because a spring return system is fitted to the tongs 10b. Cable 131 also passes over a block mounted in casing F constituted by two fixed pulleys 132 and 134 and a movable compensation pulley 136. The function of the compensation system is to control the displacement of the movable pulley 136 in such a way that this displacement compensates the difference between the winding of the control cable 131 about the elbow axis pulleys 126'a and 126'b. This control is provided by an opposing cable 138 which passes inter alia over a pulley 140 which is also movable and connected to pulley 136. The movable pulley 140 is associated with two pulleys 142 and 144, whose spindles are fixed to casing F. Thus, by using cable 138 to bring about a displacement of pulley 140 by a length equal to half the winding difference on pulleys 126'a and 126'b said same displacement is communicated to pulley 136, which brings about a strict compensation. Thus, one end of the cable 138 carrying the reference numeral 138' is fixed to a pulley 126"a mounted on the elbow spindle 8a of master arm 6a and fixed to the latter. In the drawing pulley 126"a has been offset to make the drawing easier to understand. The other end 138" of compensation cable 138 is fixed to a pulley 146 and passes over the latter. Pulley 146 is mounted on shaft 52 and is integral in rotation with arm 6b (see pulley 62' shown in FIG. 4b). The rotation of pulley 62' is identical to the rotation of pulley 62 mounted on elbow spindle 8b of the slave arm.

In this way this device leads to a strict compensation of the cable 131 for controlling the closing of the tongs.

Figure 8:
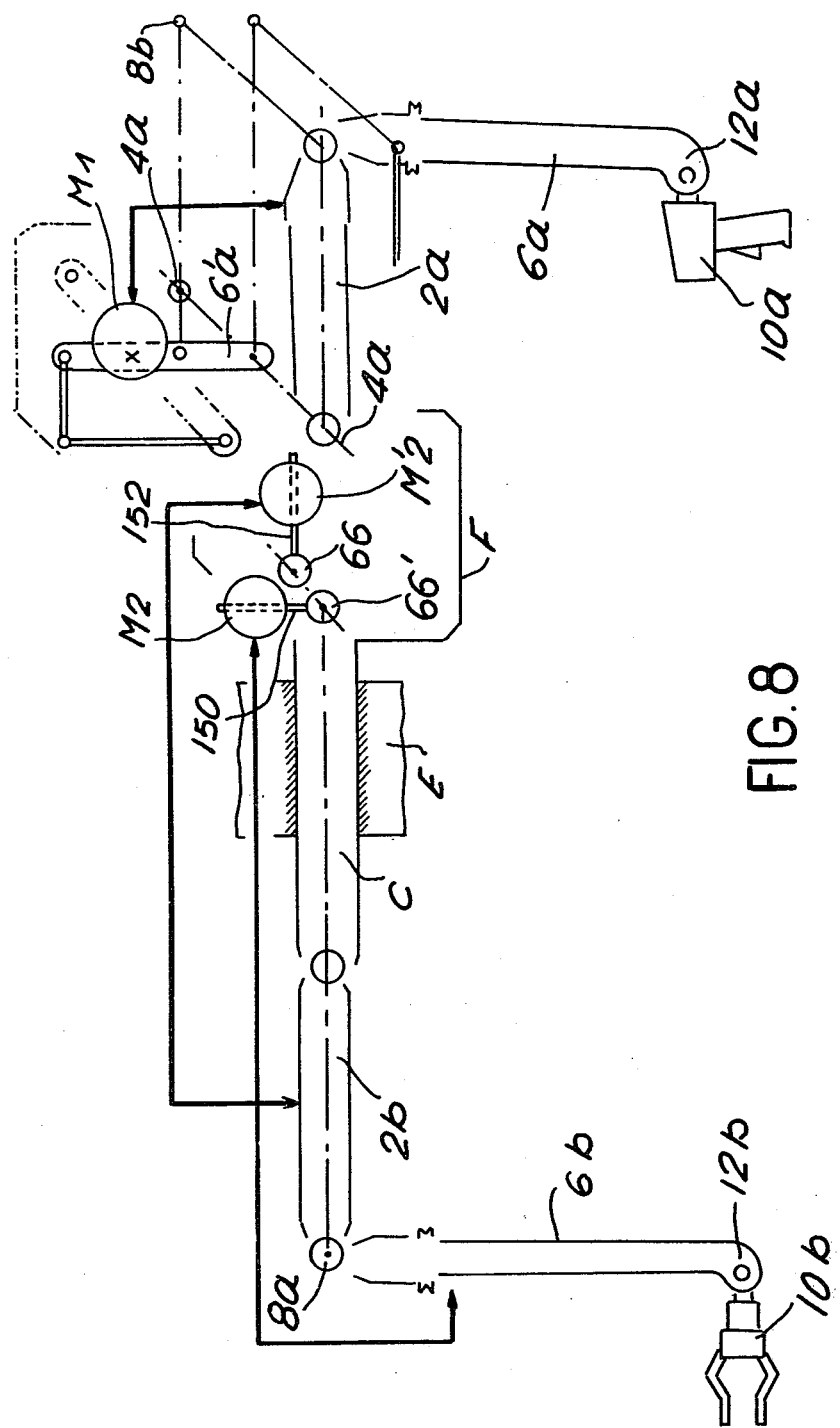
FIG. 8 a simplified view of the manipulator showing the complete balancing system.

Finally FIG. 8 shows the balancing systems for the upper and lower arms of the master and slave parts.

The balancing of the master arm system is ensured by means of a counterweight $M_1$ which is fixed to the already described lever 6'a. It is merely pointed out that said lever is forced to remain parallel to the lower arm 6a of the master arm. By appropriately regulating the position of counterweight $M_1$ relative to the lever and by appropriately defining its weight a balancing of the master arm is obtained. Obviously this balancing does not take account of variations in the position of the control handle 10a relative to the knuckle joint axis 12a. In practice it is pointed out that the manipulator has two levers 6'a position on either side of shaft C and the balancing is obtained by two identical counterweights arranged on either side.

The balancing of the slave arm system is provided by means of two counterweights $M_2$ and $M_2'$. Counterweight $M_2$ is fixed to the end of a lever 150 which is forced to remain parallel to arm 6b, whilst being integral with pulley 66'. Counterweight $M_2$ balances the lower arm. The upper arm 2b and the weight of the lower arm applied at 8b is balanced by counterweight $M'_2$ fixed to the end of lever 152, itself fixed to pulley 56. Lever 152 is thus forced to remain parallel to the upper arm 2b.

The torque required of $M_2$ is less than that required of $M'_2$ so that as the levers are on either side of the shaft identical counterweights are positioned with different lever arms in order to respect the balancing of the system about the shaft axis.

In conclusion it is apparent that the manipulator according to the invention makes it possible to effectively obtain at least in its plane, homothetic displacements. Moreover it is able to bring about a displacement between the master arm and the slave arm without disturbing the homothetic displacements. It also provides particularly advantageous conditions of use and requires to special drive.

As indicated hereinbefore and although the detailed description of the preferred embodiment relates to a manipulator in which the master arm is of the articulated type the transmission control procedure for the control of the slave arm by the master arm and the way in which the displacement is obtained can be adapted to the case where the manipulator has a telescopic master arm. The circular arc displacement shown leads to a minimum disturbance of the homothetic transformation in the lateral movements, except in the case of an extreme displacement.

According to a variant of the invention involving a displacement parallel to the shaft the spatial correspondence is strictly ensured.

What is claimed is:

1. A master-slave manipulator having a master arm provided with a control handle and a slave arm controlled by the master arm and provided with a tool, said arms being connected by a shaft mounted in pivotal manner about a shaft axis with respect to a fixed support, the master arm and the slave arm each being of the articulated type and having an upper arm articulated about a shoulder axis perpendicular to the shaft axis and a lower arm articulated with respect to the upper arm about an elbow axis parallel to the shoulder axis, said manipulator comprising first means for defining a first point occupying a homethetic position of the control handle in a homothetic transformation of negative ratio relative to the shoulder axis of the master arm, and second means for placing said tool in a homothetic position of said first point in a homothetic transformation of negative ratio relative to a second point connected to the shaft, said first means comprising a first lever and a second lever which are both articulated and are parallel to the lower arm and to the upper arm of the master arm, respectively, and whose length ratio is the same as the ratio of the lengths of the lower and upper arms of the master arm, and said second means comprising a firt rod articulated to said first point about a first axis perpendicular to the shaft axis and a second rod having one end articulated to the first rod about a second axis parallel to the first axis and another end articulated to said second point about a third axis parallel to the first axis, means being provided to maintain one of the rods parallel to the upper arm of the slave arm and the other rod parallel to the lower arm of the slave arm, the ratio of the length of the rods being the same as the ratio of the lengths of the lower and upper arms of the slave arm.

2. A manipulator according to claim 1, including means for displacing the second point relative to the shaft.

3. A manipulator according to claim 2, wherein the means for displacing the second point comprise a third rod controlled by an actuator and pivoting about a fourth axis connected to the shaft, the other end and the third rod driving the said first and second rods.

4. A manipulator according to claim 3, including two systems of first and second rods, the first system controlling the movements of the upper slave arm and the second controlling the movements of the lower slave arm, said two systems being arranged symmetrically with respect to the shaft axis.

5. A manipulator according to claim 4, wherein the first rod of the first system is parallel to the lower slave arm and the second rod is parallel to the upper slave arm, and wherein the first rod of the second system is parallel to the upper slave arm and the second rod of the second system is parallel to the lower slave arm.

6. A manipulator according to claim 5, including a first pulley mounted in pivotal manner on an articulation spindle of the second rod of the first system with the said third rod and fixed to the second rod, a second pulley mounted in pivotal manner on an articulation spindle of the second rod of the second system with the third rod and fixed to the second rod, first transmission means for transmitting the rotation angle of the first pulley to a first shoulder pulley mounted on a slave shoulder spindle and fixed to the upper slave arm and second transmission means for transmitting the rotation angle of the second pulley to an elbow pulley mounted on the slave elbow spindle and fixed to the lower arm.

7. A manipulator according to claim 6, wherein the first transmission means comprises a first pulley mounted freely on the drive shaft of the third rod, a first intermediate pulley mounted in pivotal manner on a spindle fixed to the shaft and parallel to the shoulder spindle and chain, cable or pinion means for linking in rotation said first intermediate pulley to said first shoulder pulley and wherein the second transmission means comprises a second pulley mounted freely on the drive shaft of the third rod, a second intermediate pulley mounted in pivotal manner on the same shaft as the first intermediate pulley and a second shoulder pulley mounted freely on the same shaft as the first shoulder pulley and chain, cable or pinion means for interconnecting in rotation the said pulleys and for connecting the second intermediate pulley to the second shoulder pulley and the second shoulder pulley to the elbow pulley.

8. A manipulator according to claim 7, including a system for balancing the master arm having a weight fixed to the second lever associated with the master arm and a balancing system for the slave arm comprising a first weight fixed to the end of a first lever integral in rotation wih the first intermediate pulley and parallel to the upper slave arm and a second weight fixed to the end of a second lever integral in rotation with the second intermediate pulley and parallel to the lower slave arm.

9. A manipulator according to claim 6, in which the tool is constituted by tongs, whose closing is controlled by a single cable passing over shoulder pulleys and master and slave elbow pulleys wherein said manipulator comprises a cable for compensating the closing of the tongs, said cable being fixed by one of its ends to an elbow pulley integral wih the lower master arm and by its other end to a pulley integral in rotation with the second pulley mounted freely on the drive shaft of the third pulley, said compensation cable passing over a first block mounted in the said shaft and whose movable pulley is fixed to the movable pulley of a second block also mounted in the shaft and over which passes the closing cable for the tongs.

10. A manipulator according to claim 4, wherein the first rod of the two systems is parallel to the upper slave arm and wherein the second rod of the two systems is parallel to the lower slave arm.

11. A manipulator according to claim 10, including a first pulley mounted in pivotal manner on an articulation spindle of said first and second rods of the first system and fixed to the first rod, a second pulley mounted in pivotal manner on an articulation spindle of the second rod of the second system with the third rod and fixed to the second rod, first transmission means for transmitting the rotation angle of the first pulley to a first shoulder pulley mounted on a slave shoulder spindle and fixed to the upper slave arm and second transmission means for transmitting the rotation angle of the said second pulley to an elbow pulley mounted on the slave elbow spindle and fixed to the lower arm.

12. A manipulator according to claim 11, wherein the first transmission means comprise a return pulley mounted freely on the articulation spindle of the second rod with the said third rod, the second pulley mounted freely on the drive shaft of the third rod, a first intermediate pulley mounted in pivotal manner on a spindle integral with said shaft parallel to the shoulder spindle and chain, cable or pinion means for interconnecting in rotation the said pulleys and for connecting in rotation the first intermediate pulley to the first shoulder pulley and wherein the second transmission means comprise a second pulley mounted freely on the drive shaft of the third rod, a second intermediate pulley mounted in pivotal manner on the same shaft as the first intermediate pulley and a second shoulder pulley mounted freely on the same shaft as the first shoulder pulley and chain, cable or pinion means for interconnecting in rotation the said pulleys and for connecting the third intermediate pulley to the second shoulder pulley and the second shoulder pulley to the elbow pulley.

* * * * *